March 22, 1932.    W. F. KAUFMAN    1,850,631
MANUFACTURE OF EMBOSSED STRAIGHT LINE LINOLEUM
Original Filed Oct. 7, 1929    2 Sheets-Sheet 1
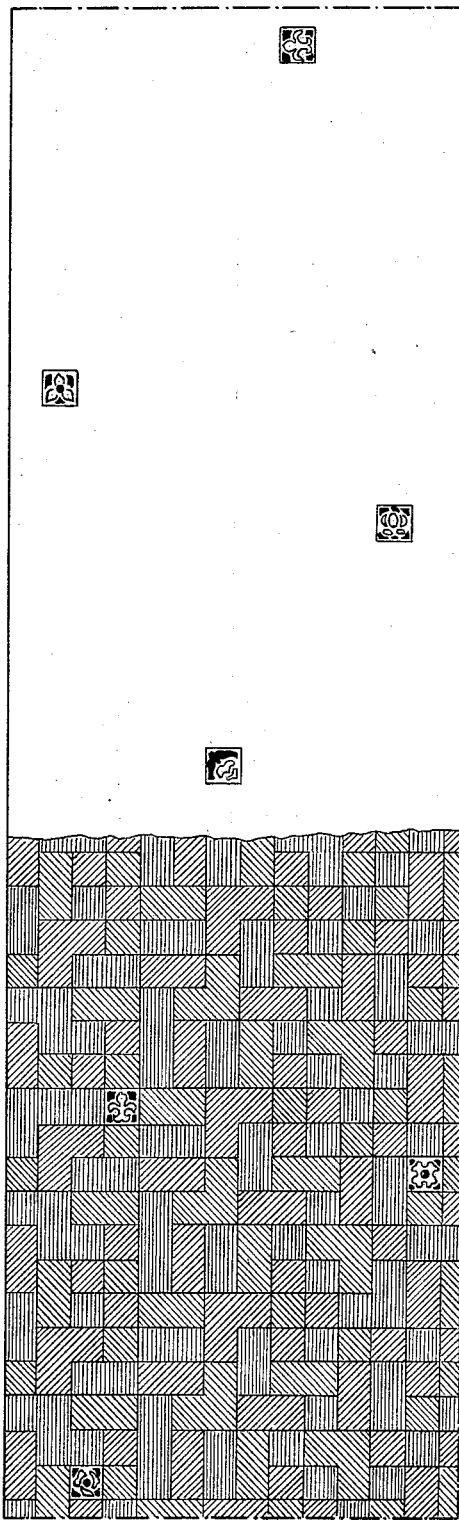
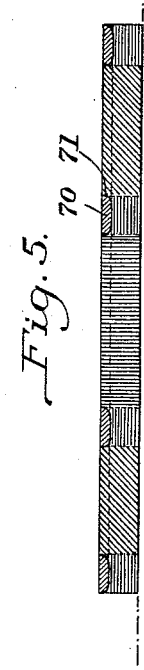
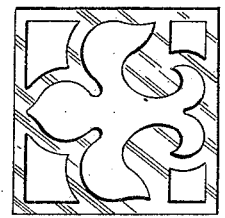
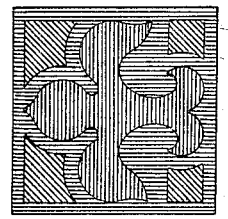
INVENTOR
Walter F. Kaufman,
by his attys,
Byrnes, Stebbins, Parmelee & Blenko

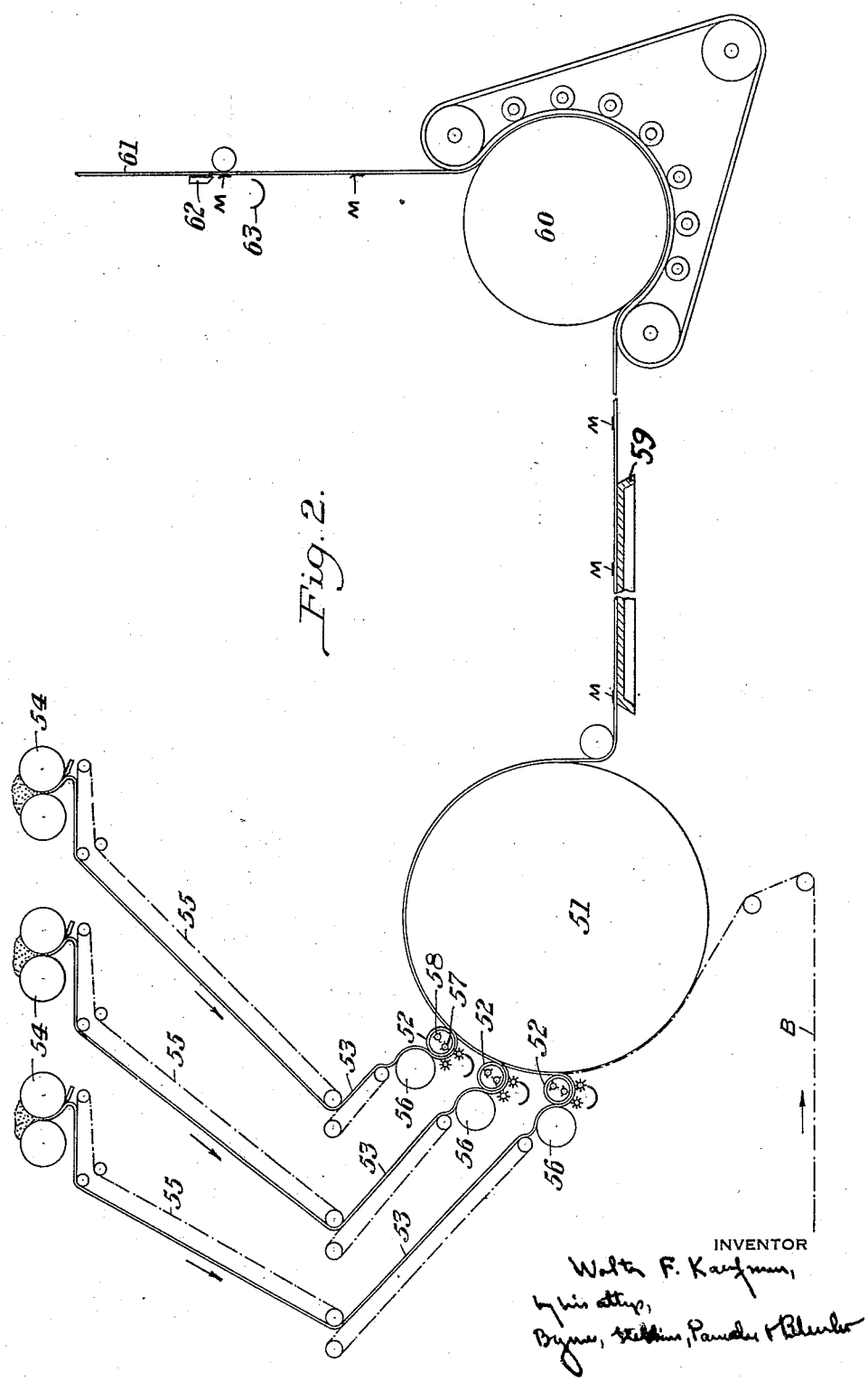

Patented Mar. 22, 1932

1,850,631

UNITED STATES PATENT OFFICE

WALTER F. KAUFMAN, OF LANCASTER, PENNSYLVANIA, ASSIGNOR TO ARMSTRONG CORK COMPANY, OF LANCASTER, PENNSYLVANIA, A CORPORATION OF PENNSYLVANIA

MANUFACTURE OF EMBOSSED STRAIGHT LINE LINOLEUM

Original application filed October 7, 1929, Serial No. 397,777. Divided and this application filed October 16, 1929. Serial No. 399,952.

This invention relates to the manufacture of embossed straight-line linoleum and is a division of my application, Serial No. 397,777 filed October 7, 1929.

In said application there is disclosed and broadly claimed the embossing of hard surface coverings, such as linoleum, by the placing of a mask or masks over the surface portions to be embossed and the application of pressure thereto so as to force the same into the material. The form of the invention herein described has particular reference to the manufacture of straight-line linoleum; that is to say, linoleum made by assembling cut-out pattern elements on a backing and consolidating the same therewith.

Straight-line linoleum may be made by hand or by the well-known rotary machine. For high speed rapid production the rotary machine offers numerous advantages, but it is limited in the number of colors which may be employed and, because of the high speed necessary for economical operation, the material which it produces cannot be intermittently pressed but must be continuously pressed as by a roll calender.

In the usual operation of a rotary machine there is supplied a web of linoleum mix corresponding to each color in the pattern, each web having an area equal to the total area of the goods produced. This is true even though only a very small part of the product is of a given color, the remainder of the web of that particular cooler being discharged as scrap. There must be a separate die roll for each color in the pattern and therefore it has not been feasible to make linoleum on a rotary machine having small haphazard design figures. Furthermore, the repeat length of patterns on rotary machines has generally been only 18 inches, although by the invention of John Wiley, Serial No. 365,625, filed May 24, 1929, it is possible to make the repeat length as high as 54 inches.

Because of the high speed of manufacture, the necessity for continuous calendering, and the difficulty of securing registration, it has heretofore been impossible to manufacture embossed straight-line linoleum on the rotary type of machine. I have provided for placing masks over at least some of the pattern elements and compressing the goods. The masks may be placed over any desired part of the pattern and they travel through the calender with the goods, being forced by the roll calender into the linoleum and embossing the same. The masks may be made of soft metal so as to take the curvature of the calender roll. When the linoleum is straightened out after leaving the roll calender, the curl imparted to the masks causes them to project upwardly from the material, making it easy to pick the masks off.

If it is desired to employ haphazard design elements these may be inserted. If a rotary machine is used the control of the scrap may be so regulated that blank spaces are left on the backing, in which spaces the special pattern elements may be inserted; or if desired, pattern elements laid by the die rolls may be taken off by workmen before the goods is calendered and special pattern elements inserted in their place. With this last arrangement a truly haphazard "spotting" of the pattern is obtained. Various kinds of preformed pattern elements may be made up and dropped into the goods at different points depending on the whim of the operator. This removes any sameness of appearance and enhances the value of the product.

In the accompanying drawings, illustrating the present preferred embodiment of the invention as applied to a rotary machine, Figure 1 is a plan view of a piece of linoleum made according to my invention;

Figure 2 is a diagram of a rotary machine embodying the invention;

Figure 3 is a plan view of a special insert which may be employed;

Figure 4 is a view of a corresponding mask therefor; and

Figure 5 is a sectional view through a special figure such as shown in Figure 3 but illustrating a modification.

The linoleum shown in Figure 1 is a conventional tile pattern having special inset figures therein. It will be noted that the figures are placed in no set relationship to one another but are arranged at irregular intervals. There is therefore no fixed repeat length to the pattern.

Figure 2 illustrates a rotary machine wherein a backing B of burlap is supplied to a drum 51 having die rolls 52 arranged therearound. Each die roll is supplied with a web 53 of linoleum mix from a calender 54, the material being carried from the calender by belts 55. This web of linoleum passes between a die roll 52 and a coacting platen roll 56. As is well known, the die rolls have knives arranged on their surface, which knives cooperate with the platen roll to cut the web of material into pattern elements and scrap. Pin rolls 57 are effective for discharging the scrap, and pin rolls 58 are effective for laying the pattern elements onto the backing. In the material shown in Figure 1 the tiles making up the pattern are in three colors, there being a color corresponding to each of the die rolls 52. The die rolls are not employed for laying in the special pattern elements of Figure 1. These are put in place by the workmen as the material travels over an inspection table 59 on its way to the calender 60. In one form which my invention may take, the workmen alongside the inspection table 59 lift off pattern elements laid by the die rolls and substitute therefor preformed special pattern elements. These are placed in various positions depending on the fancy of the operator. A number of special design elements are provided, as shown in Figure 1, these being inserted in no particular order.

If it is desired to emboss these special pattern elements, or for that matter to emboss pattern elements laid by the die rolls, masks M are employed. In Figure 2 the masks are shown as being placed over the goods as it travels over the inspection table 59. The roll calender 60 is effective for consolidating the pattern elements with the backing and with one another. The masks are of a thickness substantially corresponding to the desired depth of the embossing, and as the material travels through the calender the masks are forced into the linoleum.

The masks preferably employed are of thin soft metal which adapts itself to the curvature of the calender and retains such curvature after the material has left the calender and is travelling in a vertical run as indicated at 61. The curvature imparted to the masks causes them to project outwardly from the goods during this vertical travel to be engaged by a bar 62 and thus picked off and discharged into a trough 63.

If desired, the discharge of scrap may be so controlled as to leave blank spaces on the backing into which the special design elements are placed by the operator. This is described and claimed in the copending application of Charles F. Humphreys, Serial No. 363,581, filed May 16, 1929, and in the Wiley application above referred to. This latter procedure has the disadvantage that the special pattern elements lie in straight lines and recur at regular intervals.

The inset pattern elements may be made up in any desired way. Figure 3 shows a conventional fleur-de-lis in three colors, and Figure 4 shows a corresponding mask.

In order to avoid any difficulty in obtaining registration between the mask and the special pattern element at the high speeds at which the material travels, it may be desirable to preliminarily emboss the special pattern elements. This is shown in Figure 5 wherein a fleur-de-lis pattern such as Fig. 3 has been embossed under a mask 70. The mask is allowed to remain in place while the embossed pattern element is dropped into the goods and the calendering is effected. In this case the mask preserves the embossing during the calendering operation. It is also of value in that it makes the special pattern elements easy to handle and eliminates breakage thereof (they are made of relatively fragile uncured linoleum mix) during handling.

As shown in Figure 5, the corners of the masks are rounded, as indicated at 71, so as to impart the desired contour to the embossed portions. The masks may be otherwise shaped as desired.

As shown in Figure 1, like figures in the material may be differently oriented, thus further removing any "mechanical" appearance of the goods.

If desired, the special inset figures may be made by the molded inlaid process. Heretofore it has always been considered necessary to use a low heat sensitive mix for the molded inlaid process. However, when the main body of the pattern is made by the straight-line process, it is necessary to use a straight-line mix in order to get a good joint. The mixes in the body of the sheet and in the special figures should be very nearly the same so that when the assembled sheet is pressed and subjected to the same heat and pressure in all parts the different portions of the sheet will react the same to the conditions to which they are subjected and make a uniform product. A little difficulty will be experienced in molding the straight-line material because of its tendency to ball up and not fall freely through the stencil openings. However, by careful manipulation, the material can be successfully molded, and the figures thus formed can be dropped into the pattern.

By my invention new effects can be obtained in straight-line linoleum at very low expense. In the case of the rotary machine the presence of the inspectors is required and little extra labor is involved in placing the special pattern elements in the goods. In the case of hand laid linoleum, no extra labor is involved in placing special pattern elements as distinguished from those forming the background of the goods.

I have illustrated and described the present preferred form of the invention as applied to the rotary machine. It will be understood, however, that it is not limited to the form shown nor to the recited sequence of steps but may be otherwise embodied within the scope of the following claims, which, likewise, are not limited to the sequence of steps as recited.

I claim:

1. In the method of making embossed straight-line linoleum, the steps consisting in placing cut-out pattern elements of sheet material on a backing, placing masks over at least some of the cut-out elements, and compressing the goods.

2. In the method of making embossed straight-line linoleum, the steps consisting in placing cut-out pattern elements of sheet material on a backing, providing blank spaces in the goods, filling in the same with special pattern elements, placing masks over at least some of the pattern elements, and compressing the goods.

3. In the method of making embossed straight-line linoleum, the steps consisting in placing cut-out pattern elements on a backing, pulling off certain of the pattern elements so as to leave blank spaces in the goods, and filling in the same with special pattern elements.

4. In the method of making embossed straight-line linoleum, the steps consisting in placing cut-out pattern elements on a backing, pulling off certain of the pattern elements so as to leave blank spaces in the goods, filling in the same with special pattern elements, placing masks over at least some of the pattern elements, and compressing the goods.

5. In the method of making embossed straight-line linoleum, the steps consisting in placing cut-out pattern elements on a backing, at least some of the pattern elements being embossed by having masks lying in the embossed portions, and compressing the goods.

6. In the method of making embossed straight-line linoleum, the steps consisting in placing cut-out pattern elements on a backing, at least some of the pattern elements being embossed by having masks lying in the embossed portions, and compressing the material, said masked elements being placed in the goods in a haphazard manner.

7. In the method of making embossed straight-line linoleum, the steps consisting in placing cut-out pattern elements on a backing, providing blank spaces in the pattern, filling in the same with embossed pattern elements having masks lying in the embossed portions, and compressing the goods.

8. In the method of making embossed straight-line linoleum in a machine effective for cutting webs of sheeted linoleum mix into pattern elements and scrap and applying the pattern elements to a backing, the steps consisting in so applying the major portion at least of the design elements making up the pattern, masking at least some portions of the material, and calendering it.

9. In the method of making embossed straight-line linoleum in a machine effective for cutting webs of sheeted inoleum mix into pattern elements and scrap and applying the pattern elements to a backing, the steps consisting in so applying the major portion at least of the design elements making up the pattern, setting in special pattern elements, masking at least some portions of the material, and calendering it.

10. In the method of making embossed straight-line linoleum in a machine effective for cutting webs of sheeted linoleum mix into pattern elements and scrap and applying the pattern elements to a backing, the steps consisting in so applying the major portion at least of the design elements making up the pattern, removing certain of the pattern elements so applied and substituting pattern elements of another color therefor.

11. In the method of making embossed straight-line linoleum in a machine effective for cutting webs of sheeted linoleum mix into pattern elements and scrap and applying the pattern elements to a backing, the steps consisting in so applying the major portion at least of the design elements making up the pattern, removing certain of the pattern elements so applied and substituting pattern elements of another color therefor, masking at least some portions of the material, and calendering it.

12. In the method of making embossed straight-line linoleum, the steps consisting in forming pattern elements on a backing, placing masks over at least some of the pattern elements, compressing the goods, and then moving the material in a path such as to cause separation of the masks from the goods.

13. In the method of making embossed straight-line linoleum, the steps consisting in forming pattern elements on a backing, placing masks over at least some of the pattern elements, compressing the goods, moving the material in a path to impart curvature to the mask, and thereafter changing the path of the material.

14. In the method of making embossed straight-line linoleum, the steps consisting in placing cut-out pattern elements of sheet material on a backing, placing masks over at least some of the pattern elements, and continuously moving and compressing the material so as to consolidate and emboss the same.

15. In combination, means for applying cut-out pattern elements to a backing, means for masking at least some of the pattern elements, and calendering means for the masked material.

16. In combination, means for applying cut-out pattern elements to a backing, means for masking at least some of the pattern elements, calendering means for the masked material, and means for removing the masks after the material has been calendered.

17. Apparatus for making embossed linoleum comprising a calender, a mask adapted to be laid over the material and engaged therewith by the calender, and means for removing the mask from the goods after it has passed through the calender.

18. A flexible hard surfaced floor covering having special pattern elements of different design therein, different pattern elements of the same design being differently oriented.

19. Straight-line linoleum having haphazard design elements therein, there being a plurality of patterns of such elements, different design elements of the same pattern being differently oriented.

20. Straight-line linoleum having inset figures made by the molded inlaid process.

21. Straight-line linoleum having inset figures made by the molded inlaid process, said inset figures being embossed.

22. In the method of making embossed straight-line linoleum, the steps consisting in applying cut-out pattern elements to a backing, providing blank spaces in the pattern, placing molded inlaid figures therein, and compressing the material.

23. In the method of making embossed straight-line linoleum, the steps consisting in applying cut-out pattern elements to a backing, providing blank spaces in the pattern, placing molded inlaid figures therein, and compressing the material, the molded inlaid figures being made of straight-line mix.

24. In the method of making embossed straight-line linoleum, the steps consisting in applying cut-out pattern elements to a backing, providing blank spaces in the pattern, placing molded inlaid figures therein, and compressing the material, the molded inlaid figures being of a mix having substantially the same heat sensitivity as the first-mentioned pattern elements.

In testimony whereof I have hereunto set my hand.

WALTER F. KAUFMAN.